June 9, 1964 C. H. PRIESMEYER 3,136,336
VALVE
Filed Aug. 25, 1960
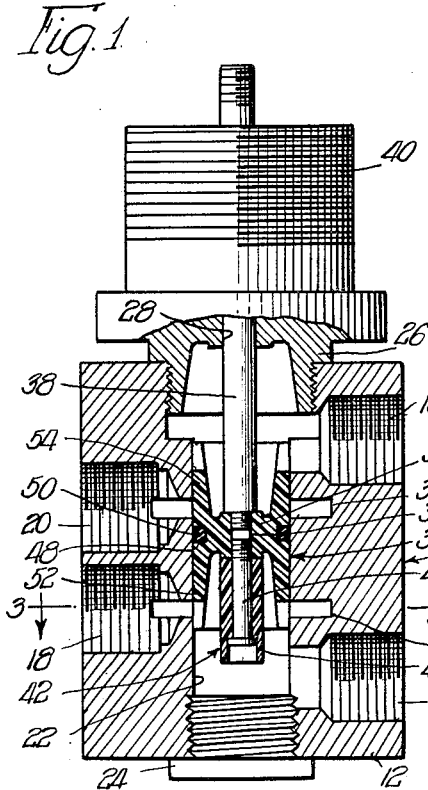
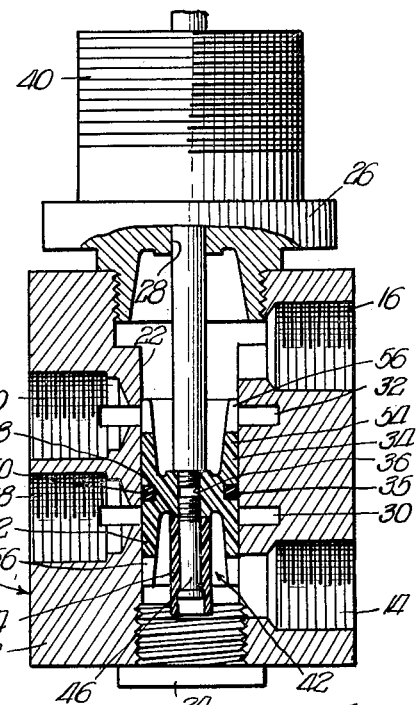
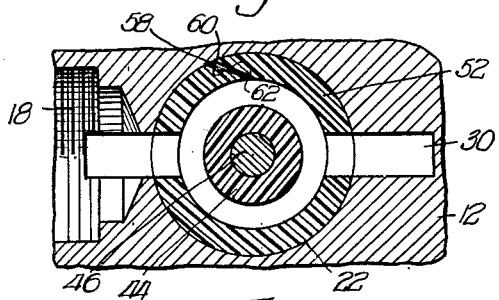
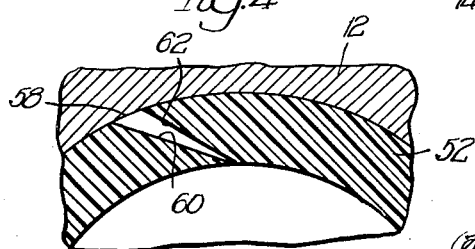
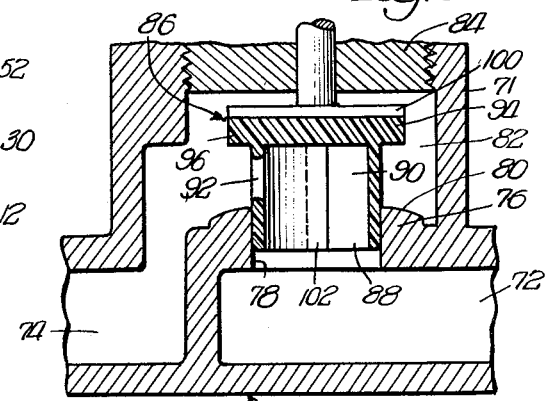
INVENTOR.
Charles H. Priesmeyer,
BY
Byron Hume, Green & Clement

United States Patent Office 3,136,336
Patented June 9, 1964

3,136,336
VALVE
Charles H. Priesmeyer, Wilmette, Ill., assignor to The Powers Regulator Company, Skokie, Ill., a corporation of Illinois
Filed Aug. 25, 1960, Ser. No. 51,876
6 Claims. (Cl. 137—625.18)

This invention pertains to valves, in particular the type of valves utilized for controlling flowable media between a source of the same and some predetermined point.

One type of valve that has come into vogue within the past few years includes a piston member which is adapted to be reciprocated within a bore for connecting and disconnecting inlet and outlet ports which open onto the bore. The reciprocation of the piston within the bore may be effected manually or by some remote control means such as pneumatic or hydraulic motors, solenoids, and the like. This type of valve has many applications, in addition to the simplest application of connecting a single source to some predetermined point. For example, the valve may be connected to sources of hot and cold water at the same time and be adapted to distribute the same either selectively or mixed upon positioning of the valve piston.

One of the problems encountered with the piston type of valve is leakage around the piston. In order to prevent the leakage it is necessary to precision fit the piston to the bore so that there is a minimum of clearance between the two. This requirement necessitates somewhat costly machining procedures, which even in themselves do not always provide the desired results.

A further disadvantage to the close fit proposition lies in the fact that the closeness causes a certain amount of frictional drag. This drag is particularly undesirable in systems where the valve is actuated by some automatic response means, such as a solenoid, or a diaphragm motor. The forces generated by these automatic actuating systems are generally small in magnitude so that the frictional drag relative thereto can be quite large.

Even if the piston and the bore are matched so as to provide a minimum of clearance, the repeated reciprocation of the former over a long period of time causes wear, which eventually results in a greater clearance than initially existed. This additional clearance defeats the purpose of the close tolerances and permits undesirable leakage around the piston.

For these reasons I have invented a piston type valve which eliminates the necessity for maintaining the extremely close tolerances heretofore necessary with conventional designs in order to minimize leakage.

As a matter of fact it will be seen that as a result of this invention the pressure of the liquid tends to force the piston into sealing engagement with the bore, so that there is substantially little or no leakage. Furthermore, the greater the pressure the greater the sealing contact so that any greater tendency to leak as the result of an increase in pressure is offset.

The invention also permits the use of materials which have extremely low coefficients of friction so that the amount of frictional drag between the piston and the bore within which it is mounted is minimized. The invention also lends itself to the utilization of materials that are low in cost, so as to permit substantial savings in the ultimate cost of the valve.

A foremost feature and object of this invention resides in the provision of a valve in which the pressure of the liquid controlled tends to force the valve into sealing engagement with the bore in which it is mounted.

Another feature and object of the invention resides in the provision of a piston valve in which the requirement for extremely close tolerances between the piston and the bore in which it is mounted are substantially eliminated.

Another object of the invention resides in the provision of a valve in which the piston is forced to expand into sealing engagement with the bore in which it is mounted by the pressure of the liquid which it controls.

A still further object of the invention resides in the provision of a valve in which there is a minimum of frictional drag between the piston and the bore in which it is mounted.

Another object of the invention resides in the provision of a valve which is especially suited to be constructed of Teflon.

Other features and objects along with those set forth hereinabove will be apparent upon reading of the specification with reference to the following drawing.

In the drawing:
FIGURE 1 is a sectional view of a first embodiment of a valve embodying the invention when in a first open position.
FIGURE 2 is a sectional view similar to FIG. 1, except that the valve is in a second open position.
FIGURE 3 is a sectional view taken along the lines 3—3 in FIG. 1.
FIGURE 4 is a fragmentary view in section showing the piston when in its expanded condition.
FIGURE 5 is a sectional view of a second type of valve embodying the invention.

It will be apparent upon reading of the specification that the subject invention may be utilized in numerous types of systems and for controlling various types of fluid media. However, for purposes of convenience the specification hereinafter will refer to sources of hot and cold water as controlled by the subject invention. It is to be understood that this reference to water is merely by way of example for convenience and in no way to be construed as a limitation.

Except where noted hereinafter, the valve may be constructed out of any suitable material, such as metals or plastics that have the physical properties to provide the results desired. The valves embodying the invention may be actuated manually or automatically by some remote control means such as pneumatic motors, electrical motors, solenoids and the like.

Referring now to FIGS. 1 and 2, there is shown one type of a valve embodying the invention generally denoted by the numeral 10. The valve 10 includes a casing 12, which may be constructed of any suitable material as mentioned previously. The casing 12 is provided with the inlet ports 14 and 16, which are adapted to be connected to sources of hot and cold water, respectively. The casing 12 is also provided with the outlet ports 18 and 20, which are adapted to be connected to the respective inlet ports 14 and 16, in the manner explained hereinafter.

A bore 22 extends through the casing 12 so as to connect the ports 14 and 16 with the ports 18 and 20. At one end the bore 22 is closed by means of the threaded plug 24. At the other end the bore 22 is threaded to receive the cap 26 through which extends the aperture 28.

The casing 12 is provided with the under cuts 30 and 32, which are coincident with the outlet ports 18 and 20. The under cuts 30 and 32 facilitate the flow of water from the respective inlet ports 14 and 16 when the valve is in one of its open positions.

A piston member, generally denoted by the numeral 34, is slidably mounted within the bore 22. The piston member 34 is adapted to be reciprocated within the bore to permit selective communications between the inlet ports 14 and 16 and their respective outlet ports 18 and 20. The piston 34 is provided with the aperture 36 which receives the threaded end of the actuating rod 38. The rod 38 extends through the aperture 28 and is connected to some means for reciprocating the piston 34 within the bore 22. In this particular instance a movable wall or diaphragm motor is schematically indicated in FIGS. 1 and 2 and generally denoted by the numeral 40. The motor 40 is adapted to receive a pressure signal generated by a suitable source so as to be deflected in accordance with such signal and in turn reciprocate the piston 34. A stop member, generally denoted by the numeral 42, is secured to the piston 34 to define the limits of the reciprocation within the bore 22. The stop member 42 includes the sleeve 44, which is secured to the piston 34 by means of the bolt 46, which is threadably received within the aperture 36.

The piston 34 is provided with the annular groove 48 in which is disposed the sealing ring 50. The piston 34 is also provided with the annular portions 52 and 54. The annular portions 52 and 54 include the diametrically opposed slots 56 at their respective ends. The length of the piston 34, including the skirts 52 and 54, is such that the inlet ports 14 and 16 are always uncovered. The outlet ports 18 and 20, however, may be blocked or unblocked depending upon the position of the piston 34. It is through this blocking and unblocking of the outlet ports 18 and 20 that the valve 10 controls the flow from the sources of hot and cold water.

When the valve is in the position shown in FIG. 1, the slots 56 in the annular portion 52 are aligned with the outlet port 18. Since the inlet port 14 is uncovered the cold water flows from there into the outlet 18. The center portion 35 of the piston 34 prevents the water from the port 14 from flowing into the outlet port 20. At the same time the outlet port 20 is blocked by the annular portion 54, so that hot water cannot flow into it from the port 16.

When the piston 34 is in the position shown in FIG. 2 the port 20 is uncovered or aligned with the slot 56 in the annular portion 54, so that water can flow from the port 16 into the port 20. At the same time the port 18 is closed by the annular portion 52, so that water cannot flow from the inlet port 14.

The piston 34 is constructed in this instance so that when positioned midway between the outlet ports 18 and 20 both of the ports are blocked. In other words, when positioned at the midway point, there will be no flow from either of the ports 14 or 16. This particular construction is merely by way of example of one type of a piston valve and it can be seen that numerous variations may be made in the construction and positioning of the ports, both inlet and outlet, with respect to the piston. As a matter of fact, the piston may be constructed so that at its midway point there is a mixing between the inlet ports 14 and 16 and so that the water is permitted to flow through a single outlet port, rather than two selective outlet ports. Thus the particular constructional features as disclosed are not to be construed as limitations, but are merely utilized to provide an example of the subject invention.

As was mentioned previously, one of the problems encountered in the type of valve shown in FIGS. 1 and 2 is the prevention of leakage between the inlet and outlet ports. This is particularly true in systems where the pressures involved are of rather high magnitude. Heretofore the practice has been to match the piston with the bore in which it is mounted in order to provide a minimum of clearance between the two. Obviously, such matching does not lend itself to the mass production techniques in use at the present. For this reason piston valves have been relatively expensive, a factor limiting their use.

The piston 34 and, particularly, the annular portions 52 and 54 are constructed of a flexible material of some suitable type. Each of the annular portions 52 and 54 is provided with a scarf cut 58 as shown in FIG. 3. By scarf cut, it is meant a cut extending through the wall of the annular portion with such cut lying along a chordal line of intersection which is spaced from the axis of the annulus. In fact the chord may be spaced from the axis so that it approaches being tangent to the inner periphery of the annulus. The cut surfaces 60 and 62 are normally in touching relationship, so that the annular construction is continuous. The touching relationship is particularly true when the outside dimensions of the annular portion are the same or substantially the same as the diameter of the bore 22. If the bore diameter should be substantially greater than the normal diameter of the annular portion 52, then the latter will expand to conform to the former. The expansion may be effected through the natural resiliency of the material from which the annular portion is constructed or through a deformation of the annular portion by the pressure of the liquid within the bore. The deformation will cause the annular portion 52 to assume the contour or diameter of the bore 22, so that there is substantially little or no clearance between the two. If the annular portion is forced to expand, the cut surfaces 60 and 62 tend to remain in touching relationship for at least a portion of their lengths. Specifically, the portion of the surfaces adjacent the inner periphery of the annulus will remain in contact. As shown in FIG. 4, the cut surfaces at the outer periphery may be slightly separated as the result of the deformation.

It is well recognized that the greater the pressure the greater the tendency to leak between two mating surfaces such as the outermost surface of the piston 34 and the bore 22. In this case the greater the pressure the more tightly the annular portions 52 and 54 are forced into engagement with the surface of the bore 22. Consequently, the greater tendency for leakage is offset by the more forceful contact between the annular portions 52 and 54 and the bore 22.

Since the annular portions 52 and 54 are expandable, it can be seen that the requirement for close tolerances as to the dimensions of the piston 34 and the bore 22 is minimized. In fact the piston 34 may be deliberately manufactured undersized, so that it will always freely fit into the bore 22 and will expand into the close-fitting relationship upon the connection of the valve 10 to sources of hot and cold water which are under pressure.

It has been found that the piston is especially suited to be constructed of tetra-fluoro-ethylene resins sold under the trademark Teflon by the E. I. du Pont de Nemours, Inc. company. It has been found that Teflon has an extremely low coefficient of friction when in contact with metallic surfaces. This feature minimizes the frictional drag between the piston and the bore 22, even when the annular portions 52 and 54 are expanded due to the pressure of the water within the valve. Teflon is also resilient, so that it may be readily deformed to assume the contour and dimensions of the bore 22.

In FIG. 5 there is shown another embodiment of the invention, generally denoted by the numeral 70. The valve 70 includes a casing 71 which is adapted to be connected to a source of water (not shown) under pressure through the inlet 72 and to direct the same when open to some predetermined point (not shown) through the exit port 74. The valve 70 is provided with the seat 76, which defines the aperture 78 and includes the seating surface 80. The casing 71 also includes the chamber 82, which is closed at its upper end by the plug 84.

A valve member 86 cooperates with the aperture 78 and the seating surface 80 to control the flow from the inlet 72 to the outlet 74. The valve 86 includes the annular portion 88, which is slidably received within the aperture 78 and defines the chamber 90. The chamber 90 is open to the incoming water from the port 72, regardless of the position of the valve with respect to the seat 80. An aperture 92 is provided in the annular portion 88 immediately below the upper end of the valve 86. The upper end of the valve 86 includes the disc 94 having a portion 96 which extends outwardly beyond the annular member 88. The portion 96 is adapted to be seated on the seating surface 80 when the valve 86 is in its lowermost position, so that the flow of water is completely stopped. As the valve is raised upwardly so that the aperture 92 clears the walls of the aperture 78, the water is permitted to flow from the inlet 72 to the outlet 74.

The disc 94 is secured by some suitable means to the actuating rod 98 and the disc 100. The actuating rod is, in turn, connected to means (not shown) for reciprocating the valve 86 with respect to the aperture 78 and the seating surface 80. The reciprocation means may be of any suitable type, such as those actuated manually, or remotely controlled, such as solenoids and pneumatic motors.

The annular portion 88 is provided with the scarf cut 102 of the same type shown in FIG. 3, that is, the cut 102 lies along a chordal line of intersection. The scarf cut 102 permits the annular portion 88 to be deformed outwardly until it assumes the contour of the periphery of the aperture 78. The close contact between the aperture 78 and the annular portion 88 substantially eliminates or at least minimizes the leakage therebetween.

The disc 96 and the annular portion 88 are constructed in the preferred embodiment of some flexible material, such as Teflon. As mentioned previously, the Teflon provides the desired resiliency and flexibility to permit the annular portion 88 to be readily expanded by the pressure of the water into engagement with the aperture 78. Teflon minimizes any tendency for frictional drag so that the valve 86 may be readily moved with respect to the valve seat 76.

While the invention has been described at least in part in terms of a preformed annulus of material having a scarf cut, which lies along a chordal line of intersection, it is to be noted that there are other methods of construction and that such description is not to be considered limiting. For example, the valve could conceivably be constructed of a sheet of flexible material, such as Teflon, in which the ends have been bevelled at complementary angles. The sheet of material could then be rolled into a cylinder of substantially the same size as the bore in which it is disposed so that the ends met. The natural resiliency of the sheet would force the material into contact with the bore so that there would be substantially no leakage between the two. The bevelled ends of the sheet would be in touching relationship with each other as described with reference to FIGS. 3 and 4, as long as the sheet was of sufficient width. The cutting of the material to a sufficient length would be a simple matter, since there would be a considerable tolerance within which the bevelled ends would be in touching relationship with any particular bore.

It can be seen that certain variations may be made of the subject invention within the scope of the claims without departing from the spirit of the invention.

What is claimed is:

1. A valve for controlling flowable media comprising a casing having first and second port means for permitting the ingress and egress of flowable media to and from the valve, respectively, and a bore connecting said first and second port means, and an annular member slidably disposed within said bore for selectively connecting said first and second port means, said annular member for at least a portion of its length comprising a cylindrically formed flexible sheath having ends bevelled at complementary angles and normally in touching relationship to form a juncture lying along a chordal line of intersection to form a scarf joint, said annular member being expandable and contractable to conform to said bore with at least a portion of said bevelled ends remaining in touching relationship with each other whereby said annular member is in sealing engagement with said bore due to the flexibility of said sheath.

2. A valve for controlling flowable media comprising a casing having first and second port means for permitting the ingress and egress of a flowable media to and from the valve, respectively, and a bore connecting said first and second port means, and an annular member constructed of a flexible material and slidably disposed within said bore, said annular member having means for controlling the flow from said first port means to said second port means, said annular member being cut through its wall along a chordal line of intersection with the cut surfaces along said cut being in touching relationship to form a scarf joint, said annular member being expandable and contractable to conform to said bore with at least a portion of said bevelled ends remaining in touching relationship with each other whereby said annular member is in sealing engagement with said bore due to the flexibility of said annular member.

3. In a valve including a casing having first and second port means for permitting the ingress and egress of flowable media to and from the valve, respectively, and a bore connecting said first and second port means, and a flexible annular member for controlling the flow from said port means to said second port means, said annular member characterized as having a cut through its wall along a chordal line of intersection with the cut surfaces normally being in touching relationship to form a scarf joint, said annular member being radially expandable and contractable to conform to said bore with at least a portion of said bevelled ends remaining in touching relationship with each other whereby said annular member is in sealing engagement with said bore due to the flexibility of said annular member.

4. A valve for controlling flowable media comprising a casing having first port means adapted to be connected to a first source of said media under pressure and second port means adapted to be connected to a second source of said media under pressure, outlet means and a bore communicating between first and second port means and said outlet means, and a piston member having an annular member longitudinally extending from one end thereof and being slidably disposed within said bore, said piston member adapted to selectively connect said first and second port means with said outlet means by reciprocation within said bore, said annular member for at least a portion of its length comprising a cylindrically formed flexible sheath having ends bevelled at complementary angles and normally in touching relationship to form a juncture lying along a chordal line of intersection to form a scarf joint, said annular member being radially expandable and contractable to conform to said bore with at least a portion of said bevelled ends remaining in touching relationship with each other whereby said annular member is in sealing engagement with said bore due to the flexibility of said annular member.

5. A valve for controlling flowable media comprising a casing having first port means adapted to be connected to a first source of said media under pressure and second port means adapted to be connected to a second source of said media under pressure, outlet means and a bore communicating between first and second port means and said outlet means, and a piston member having an annular member longitudinally extending from one end thereof slidably disposed within said bore, said piston member adapted to selectively connect said first and second port means with said outlet means by reciprocation within said bore, said annular member being constructed of a flexible material being cut through its wall along a chordal line of intersection with the cut surfaces along said cut being in touching relationship to form a scarf joint, said annular member being radially expandable and contractable to conform to said bore with at least a portion of said bevelled ends remaining in touching relationship with each other whereby said annular member is in sealing engagement with said bore due to the flexibility of said annular member.

6. A valve for controlling flowable media comprising a casing having first port means adapted to be connected to a first source of said media under pressure and second port means adapted to be connected to a second source of said media under pressure, outlet means and a bore communicating between first and second port means and said outlet means, and a piston member having a pair of flexible annular members longitudinally extending from its respective ends slidably disposed within said bore, said annular members having port means adapted to selectively connect said first and second port means with said outlet means by reciprocation within said bore, means for reciprocating said piston member within said bore, said annular members for at least a portion of their length comprising a cylindrically formed flexible sheath having ends bevelled at complementary angles and normally in touching relationship to form a juncture lying along a chordal line of intersection to form a scarf joint, said annular members being radially expandable and contractable to conform to said bore with at least a portion of said bevelled ends remaining in touching relationship with each other whereby said annular members are in sealing engagement with said bore due to the flexibility of said annular member.

References Cited in the file of this patent

UNITED STATES PATENTS

| | | |
|---|---|---|
| 329,809 | Buffet | Nov. 3, 1885 |
| 1,119,803 | Brown | Dec. 8, 1914 |
| 2,112,913 | Lechene | Apr. 5, 1938 |
| 2,655,113 | Ward | Oct. 13, 1953 |
| 2,807,511 | Fleming | Sept. 24, 1957 |
| 2,877,071 | Arnot | Mar. 10, 1959 |
| 2,970,804 | Busby | Feb. 7, 1961 |
| 2,996,082 | Miner | Aug. 15, 1961 |
| 3,009,482 | Schwartz | Nov. 21, 1961 |

FOREIGN PATENTS

| | | |
|---|---|---|
| 138,274 | Germany | Feb. 5, 1903 |
| 852,321 | Germany | Oct. 13, 1952 |